(12) United States Patent
McCaffrey et al.

(10) Patent No.: US 11,590,738 B2
(45) Date of Patent: Feb. 28, 2023

(54) MULTILAYER FILMS

(71) Applicant: Plantic Technologies Limited, Altona (AU)

(72) Inventors: Nicholas John McCaffrey, Burwood (AU); Roya Khalil, Endeavour Hills (AU); Nicholas Roy Oakley, Lara (AU); Brendan Morris, Manifold Heights (AU)

(73) Assignee: PLANTIC TECHNOLOGIES LIMITED, Altona (AU)

( * ) Notice: Subject to any disclaimer, the term of this patent is extended or adjusted under 35 U.S.C. 154(b) by 0 days.

(21) Appl. No.: 17/118,634

(22) Filed: Dec. 11, 2020

(65) Prior Publication Data
US 2021/0094263 A1  Apr. 1, 2021

Related U.S. Application Data

(63) Continuation of application No. 15/953,518, filed on Apr. 16, 2018, now Pat. No. 10,894,392, which is a continuation of application No. 14/361,772, filed as application No. PCT/AU2012/000577 on May 23, 2012, now abandoned.

(30) Foreign Application Priority Data

Dec. 22, 2011  (AU) ................. 2011905383

(51) Int. Cl.
| | | |
|---|---|---|
| *B32B 23/08* | (2006.01) | |
| *B32B 27/08* | (2006.01) | |
| *B29C 48/08* | (2019.01) | |
| *B29C 48/00* | (2019.01) | |
| *C08L 3/08* | (2006.01) | |
| *C08L 29/04* | (2006.01) | |
| *C08K 3/34* | (2006.01) | |
| *C08K 5/09* | (2006.01) | |
| *B29L 7/00* | (2006.01) | |
| *B29L 9/00* | (2006.01) | |
| *B29L 31/00* | (2006.01) | |

(52) U.S. Cl.
CPC ............ *B32B 23/08* (2013.01); *B29C 48/022* (2019.02); *B29C 48/08* (2019.02); *B32B 27/08* (2013.01); *C08K 3/346* (2013.01); *C08K 5/09* (2013.01); *C08L 3/08* (2013.01); *C08L 29/04* (2013.01); *B29K 2003/00* (2013.01); *B29K 2995/0067* (2013.01); *B29K 2995/0069* (2013.01); *B29K 2995/0097* (2013.01); *B29L 2007/008* (2013.01); *B29L 2009/00* (2013.01); *B29L 2031/712* (2013.01); *B32B 2307/7246* (2013.01); *B32B 2317/20* (2013.01); *Y10T 428/1352* (2015.01); *Y10T 428/2495* (2015.01); *Y10T 428/24975* (2015.01); *Y10T 428/3188* (2015.04); *Y10T 428/31591* (2015.04); *Y10T 428/31971* (2015.04)

(58) Field of Classification Search
CPC .. C08L 3/08; C08L 29/04; C08K 5/09; C08K 3/346; B29K 2003/00; B29K 2995/0067; B29K 2995/0069; B29K 2995/0097; B29C 48/022; B29C 48/08; B29L 2007/008; B29L 2009/00; B29L 2031/712; B32B 2307/7246; B32B 2317/20; B32B 23/08; B32B 27/08; B32B 2250/40; B32B 2262/105; B32B 2307/7244; B32B 2307/732; B32B 23/14; B32B 23/18; B32B 2439/70; B32B 27/32; B32B 37/153; Y10T 428/1352; Y10T 428/2495; Y10T 428/24975; Y10T 428/31591; Y10T 428/3188; Y10T 428/31971

See application file for complete search history.

(56) References Cited

U.S. PATENT DOCUMENTS

| | | |
|---|---|---|
| 4,393,106 A | 7/1983 | Maruhashi et al. |
| 4,842,875 A | 6/1989 | Anderson |
| 4,883,674 A | 11/1989 | Fan |
| 6,242,102 B1 | 6/2001 | Tomka |
| 7,163,967 B2 | 1/2007 | Grah et al. |
| 2001/0008658 A1 | 7/2001 | Barmore et al. |
| 2002/0099125 A1 | 7/2002 | Akkapeddi et al. |
| 2004/0242732 A1 | 12/2004 | Yu et al. |
| 2006/0260973 A1 | 11/2006 | Macinnes et al. |
| 2006/0286323 A1 | 12/2006 | Siegel et al. |
| 2007/0042207 A1 | 2/2007 | Berger et al. |
| 2007/0111005 A1 | 5/2007 | Oshita et al. |
| 2009/0110942 A1* | 4/2009 | Henderson-Rutgers ..................... B32B 27/24 428/483 |
| 2009/0179069 A1 | 7/2009 | Schmidt et al. |

(Continued)

FOREIGN PATENT DOCUMENTS

| | | |
|---|---|---|
| EP | 0471402 A2 | 2/1992 |
| EP | 0539604 A1 | 5/1993 |

(Continued)

OTHER PUBLICATIONS

Wolf, R., "A Technology Decision—Adhesive Lamination or Extrusion Coating Lamination?," www.tappi.org/content/events/10PLACE/papers/wolf1.pdf, 2010 Place Conference, Apr. 21, 2010, (26 pages).

(Continued)

*Primary Examiner* — Yan Lan
(74) *Attorney, Agent, or Firm* — Kilyk & Bowersox, P.L.L.C.

(57) ABSTRACT

There is provided a multilayer film comprising a starch layer and at least one other layer. The multilayer film has excellent barrier properties. The starch layer comprises a modified starch having a degree of substitution less than 1.5. Suitable other layers include polyolefins. The multilayer film finds use in packaging, particularly in packaging foodstuffs.

19 Claims, No Drawings

(56) References Cited

U.S. PATENT DOCUMENTS

| | | |
|---|---|---|
| 2009/0312462 A1 | 12/2009 | Oakley et al. |
| 2010/0307951 A1* | 12/2010 | Khemani ............... B29B 7/46 206/524.6 |
| 2011/0033700 A1 | 2/2011 | Caylus |
| 2011/0049002 A1 | 3/2011 | Georgelos et al. |
| 2011/0049146 A1 | 3/2011 | Illsley et al. |
| 2012/0321871 A1 | 12/2012 | Bond et al. |
| 2014/0349047 A1 | 11/2014 | McCaffrey et al. |
| 2015/0210461 A1 | 7/2015 | Morris et al. |
| 2018/0229479 A1 | 8/2018 | McCaffrey et al. |

FOREIGN PATENT DOCUMENTS

| | | |
|---|---|---|
| EP | 0649870 A1 | 4/1995 |
| EP | 2199077 A1 | 6/2010 |
| JP | 62-74648 A | 4/1987 |
| JP | 11-011533 | 1/1999 |
| NZ | 244658 A | 7/1994 |
| WO | 2006037157 A1 | 4/2006 |
| WO | 2006042364 A1 | 4/2006 |
| WO | 2007118280 A1 | 10/2007 |
| WO | 2007140538 A1 | 12/2007 |
| WO | 2008014573 A1 | 2/2008 |
| WO | 2010003958 A1 | 1/2010 |
| WO | 2010077203 A1 | 7/2010 |
| WO | 2012137014 A1 | 10/2012 |
| WO | 2013090973 A1 | 6/2013 |

OTHER PUBLICATIONS

International Search Report issued in corresponding International Patent Application No. PCT/AU2012/000577 dated Aug. 2, 2012 (3 pages).

Extended European Search Report and Written Opinion issued in corresponding European Patent Application No. 12859340.7 dated Jul. 27, 2015 (11 pages).

"Eco Film, Patented Biodegradable Film," www.CortecVpCI.com, Cortec Corporation, Mar. 5, 2003, (2 pages).

Japanese Office Action issued in corresponding Japanese Patent Application No. 2014-547625 dated May 6, 2016 (English translation only) (3 pages).

\* cited by examiner

MULTILAYER FILMS

This application is a continuation of U.S. patent application Ser. No. 15/953,518, filed Apr. 16, 2018, which is a continuation of U.S. patent application Ser. No. 14/361,772, filed May 30, 2014, which is a National Stage Application of PCT/AU2012/000577, filed May 23, 2012, which in turn claims priority to Australian Patent Application No. 2011905383, filed Dec. 22, 2011.

FIELD OF THE INVENTION

The present invention relates to multilayer films having a starch based layer and to methods of their preparation. The films find particular, although not exclusive, use in the packaging of foodstuffs.

BACKGROUND TO THE INVENTION

Multilayer films find widespread use as a packaging material in the food industry. In such application not only does the packaging material have to contain the foodstuff, it must also preserve the product. Foods are by their nature perishable and the properties of the packaging material will greatly impact the useful shelf life of a given foodstuff. Chemical changes, such as oxidation, and microbiological growth can be accelerated in the presence of oxygen. Accordingly, controlling the oxygen content in a package or the rate of oxygen ingress into a package is often one of the most critical attributes of barrier packaging.

Multilayer barriers are usually constructed with a polar polymer as an internal layer which is covered with apolar polymer. The former acts as a gas barrier, and the latter as a hydrophobic skin having a low water vapour transmission rate to prevent fast water absorption in the internal layer. Polyolefin skin layers covering a polar polymer layer are commonly utilised, for example, a polyethylene skin covering a polyethylene-vinyl alcohol copolymer (PE-EVOH).

EVOH copolymers show good oxygen barrier properties at low humidity, typically in the range of 0 to 60%. However, their gas barrier property deteriorates dramatically under high humidity conditions when the humidity is in the range of 75 to 90%. In fact, due to the polar nature of EVOH, such films generally exhibit poor moisture barrier. Therefore, EVOH is typically laminated with polyolefins on both sides to provide barrier properties for practical packaging applications in order to protect the EVOH from humidity effects. However, over time sufficient moisture may permeate the polyolefin hydrophobic skin such that the oxygen barrier properties of the EVOH layer will be compromised.

EVOH materials also require the use of adhesion promoters and/or tie-layer resins in order for them to bond adequately to polyolefin substrates. Without such tie resins, EVOH materials tend to peel off easily from the polyolefin substrate resulting in loss of barrier properties and poor appearance.

A further disadvantage of EVOH is that it is relatively expensive. Additionally, from a renewable standpoint, EVOH is fully derived from fossil fuels.

It would be desirable to provide a multilayer film that has excellent barrier properties, particularly at high humidity and which utilises inexpensive, renewable materials.

SUMMARY OF THE INVENTION

According to a first aspect there is provided a multilayer film comprising:

(a) at least one starch layer comprising a modified starch; and (b) at least one other layer having a water vapour permeability coefficient less than 1 g.mm/m$^2$.24hr.atm measured at 38° C. and 90% relative humidity; and wherein the total thickness of the at least one starch layer is greater than 20% of the total thickness of the multilayer film and wherein the modified starch has a degree of substitution less than 1.5.

Preferably the water vapour permeability coefficient of the at least one other layer is less than 0.5 g.mm/m$^2$.24hr.atm measured at 38° C. and 90% relative humidity, more preferably less than 0.2 g.mm/m$^2$.24hr.atm measured at 38° C. and 90% relative humidity.

Preferably the total thickness of the at least one starch layer is greater than 30% of the total thickness of the multilayer film, more preferably greater than 40% of the total thickness of the multilayer film, even more preferably greater than 50% of the total thickness of the multilayer film. In some embodiments the total thickness of the at least one starch layer is greater than 60% of the total thickness of the multilayer film.

The multilayer film has a low oxygen permeability coefficient (OPC). In some embodiments, the multilayer film has an OPC less than 0.6 cm$^3$ mm/m$^2$.24h.atm at 50% relative humidity (RH). Preferably the multilayer film has an OPC of less than 0.3 cm$^3$ mm/m$^2$.24h.atm at 50% RH and more preferably an OPC of less than 0.2 cm$^3$ mm/m$^2$.24h.atm at 50% RH. Most preferably, the multilayer film has an OPC of less than 0.1 cm$^3$ mm/m$^2$.24h.atm at 50% RH and particulary preferably the multilayer film has an OPC of less than 0.05 cm$^3$ mm/m$^2$.24h.atm at 50% RH.

In some embodiments, the multilayer film has an OPC less than 1.2 cm$^3$ mm/m$^2$.24h.atm at 75% relative humidity (RH). Preferably the multilayer film has an OPC of less than 0.6 cm$^3$ mm/m$^2$.24h.atm at 75% RH and more preferably an OPC of less than 0.2 cm$^3$ mm /m$^2$.24h.atm at 75% RH. Most preferably, the multilayer film has an OPC of less than 0.1 cm$^3$ mm/m$^2$.24h.atm at 75% RH and particulary preferably the multilayer film has an OPC of less than 0.05 cm$^3$ mm/m$^2$.24h.atm at 75% RH.

In some embodiments, the OPC remains below 0.05 cm$^3$ mm/m$^2$.24h.atm at 50% RH, for extended periods of time. Preferably the OPC remains below 0.05 cm$^3$ mm/m$^2$.24h.atm at 50% RH for at least ten days, more preferably the OPC remains below 0.05 cm$^3$ mm/m$^2$.24h.atm at 50% RH for 20 days, most preferably the OPC remains below 0.05 cm$^3$ mm/m$^2$.24h.atm at 50% RH for thirty days. In a particularly preferred embodiment the OPC remains below 0.05 cm$^3$ mm/m$^2$.24h.atm at 50% RH for thirty days.

Accordingly, the multilayer films have an enhanced performance in respect of oxygen barrier properties over long periods of time. While not wishing to be bound by theory it is considered that the high moisture capacity of the at least one starch layer acts to extend the lifetime of the oxygen barrier effect, even when moisture levels within the at least one starch layer are relatively high.

Such longevity in respect of gas barrier performance is clearly desirable in extending the shelf life of packaged perishable foodstuffs.

Advantageously, from a renewable perspective the multilayer film contains a high proportion of biodegradable starch.

The thickness of the multilayer film and of each layer within the multilayer film may vary depending on the exact nature of the end use application.

Preferably, the total thickness of the multilayer film is between 10 and 1000 microns. In one embodiment the total thickness of the multilayer film is between 10 and 100 microns, more preferably between 20 and 80 microns. In another embodiment the total thickness of the multilayer film is between 100 and 1000 microns more preferably between 200 and 800 microns.

In some embodiments, the total thickness of the at least one starch layer is between 5 and 600 microns. In one embodiment, the total thickness of the at least one starch layer is between 5 and 50 microns, preferably between 10 and 40 microns. In other embodiments, the total thickness of the at least one starch layer is between 100 and 600 microns, preferably between 150 and 450 microns.

In some embodiments, the total thickness of the at least one other layer is between 5 and 400 microns. In one embodiment, the total thickness of the at least one other layer is between 5 and 25 microns preferably between 10 and 20 microns. In another embodiment, the total thickness of the at least one other layer is between 30 and 400 microns, preferably between 30 and 300 microns.

In a preferred embodiment the at least one starch layer has a total thickness between 100 and 600 micron and the at least one other layer has a total thickness between 10 and 400 micron. In another preferred embodiment the at least one starch layer has a total thickness between 100 and 400 micron and the at least one other layer has a total thickness between 40 and 250 micron.

In another preferred embodiment the at least one starch layer has a total thickness between 10 and 60 micron and the at least one other layer has a total thickness between 5 and 40 micron.

Other Layer

The other layer(s) may be chosen to impart certain physical and aesthetic properties to finished multilayer film. These properties may include, for example, antifog, strength, heat sealability, colour, or clarity. In some embodiments particularly preferred other layers are those having a low water vapour transmission rate.

In some embodiments the at least one other layer comprises a polyolefin, polyethylene terephthalate, nylon, polyvinylchloride and polyvinylidene dichloride or mixtures thereof. In one embodiment each of the other layers may comprise a mixture of components. In other embodiments one or more of the other layers may consist of multiple layers of different materials. In further embodiments each of the other layers may comprise different materials.

In some embodiments suitable polyolefins for the preparation of the polyolefin film layer are selected from the group consisting of ethylene homopolymers, propylene homopolymers, interpolymers of ethylene and propylene and interpolymers of ethylene or propylene with one or more $C_4$-$C_{10}$ α-olefins, cyclic olefin polymers and copolymers, biaxially orientated polypropylene, and mixtures thereof.

In some embodiments suitable polyolefins are selected from copolymers of ethylene or propylene and one or more α-olefins. Both high density polyethylenes and linear low density polyethylenes may be preferably utilised.

Suitable linear low density polyethylenes (LLDPE) include copolymers of ethylene and a-olefins (about 5 to about 15 wt. %). Alpha-olefins include 1-butene, 1-hexene, 1-octene, and the like, and mixtures thereof. The density of LLDPE is within the range of about 0.865 to about 0.925 $g/cm^3$.

Suitable high density polyethylenes (HDPE) include ethylene homopolymers and copolymers of ethylene and a-olefins (about 0.1 to about 10 wt. %). Suitable alpha-olefins include 1-butene, 1-hexene, 1-octene, and the like, and mixtures thereof. The density of HDPE is preferably from about 0.940 to about 0.970 $g/cm^3$.

Suitable cyclic olefin polymers and copolymers include polymers of norbornene or tetracyclododecene and copolymers of norbornene or tetracyclododecene with one or more α-olefins. Examples are cyclic olefin polymers are Topas (Ticona) and Apel (Mitsui).

In some embodiments blends of polyolefins and other polymers may be advantageously employed. Cast polypropylene (cPP) or biaxially oriented polypropylene (BOPP) may be chosen for improved strength and low WVTR. Polyethylene terephthalate (PET) may be chosen for strength and shrinkability.

In other embodiments modified polyolefins, such as grafted polyolefins, may be utilised. A preferred grafted polyolefin is a maleic anhydride grafted polyolefin.

Starch Layer

The multilayer film comprises at least one starch layer comprising a modified starch, wherein the modified starch has a degree of substitution less than 1.5. The degree of substitution defines the average number of substituents per anhydroglucose unit. Accordingly, by definition, the maximum possible degree of substitution of starch is 3.0.

In one embodiment the at least one starch layer comprises a high amylose starch. Preferably, the amount of high amylose starch is between 5 and 80% by weight based on the total weight of the starch layer.

In another embodiment the modified starch is chemically modified so as to replace hydroxyl functionality with functionality selected from the group consisting of ethers and esters and mixtures thereof. Preferred esters comprise heptanoate or lower homologues. Particularly preferred esters include acetate.

In a further embodiment the modified starch is modified to include a hydroxyalkyl $C_{2-6}$ group or modified by reaction with an anhydride of a carboxylic acid. Preferably the modified starch is modified to include a hydroxy $C_{2-4}$ group. More preferably the modified starch is modified to include a hydroxy propyl group.

In a yet further embodiment the at least one starch layer comprises a water soluble polymer. Preferably, the starch comprises 1 to 20% by weight of a water soluble polymer, more preferably from 4 to 12% by weight of a water soluble polymer. Exemplary, but non-limiting, water soluble polymers are selected from the group consisting of polyvinylacetate, polyvinyl alcohol or mixtures thereof. Polyvinyl alcohol is a particularly preferred water soluble polymer.

In some embodiments the at least one starch layer may comprise water, preferably up to 20% by weight water, more preferably up to 12% by weight water. In some embodiments the water may serve as a plasticiser.

In some embodiments the moisture content of the at least one starch layer is generally the equilibrium moisture content at the environmental % RH. For example, the equilibrium moisture content ranges from about 4% at low % RH to more than 15% at high % RH.

In a still yet further embodiment the at least one starch layer comprises one or more polyol plasticisers, preferably up to 20% by weight of one or more polyol plasticisers, more preferably up to 12% by weight of one or more polyol plasticisers. Exemplary, but non-limiting, polyol plasticisers are selected from the group consisting of sorbitol, glycerol, maltitol, xylitol, and mixtures thereof.

In another embodiment the at least one starch layer may also comprise up to 50% by weight of natural unmodified starch.

In some embodiments the at least one starch layer comprises mixtures of starches and/or modified starches, for example, mixtures of high and low amylose starch, wherein one or more of the starch components may be modified.

In a further embodiment the at least one starch layer comprises a lubricant. Preferred lubricants are $C_{12-22}$ fatty acids and/or $C_{12-22}$ fatty acid salts. Preferably, the $C_{12-22}$ fatty acid and/or a $C_{12-22}$ fatty acid salt are present in an amount up to 5% by weight.

In some embodiments the at least one starch layer comprises one or more nanomaterials. Preferably, the nanomaterials are exfoliated within a starch nanocomposite. Exemplary nanomaterials include clays and modified clays particularly 'hydrophobically modified layered silicate clays'. Preferred clays include montmorillonite, bentonite, beidelite, mica, hectorite, saponite, nontronite, sauconite, vermiculite, ledikite, magadite, kenyaite, stevensite, volkonskoite or a mixture thereof. A 'hydrophobically modified layered silicate clay' or 'hydrophobic clay' is preferably a clay modified by exchange with a surfactant comprising long chain alkyl groups such as a long chain alkylammonium ion, for example, mono- or di-$C_{12}$-$C_{22}$ alkylammonium ion, wherein polar substituents such as hydroxyl or carboxyl are not attached to the long chain alkyl. Examples of suitable clays include CLOISITE® 20A or CLOISITE® 25A from Southern Clay Products Inc.

In some embodiments the starch layer and/or the other layer may comprise colourants.

Adhesive

In some embodiments the at least one other layer may be fixed to the at least one starch layer through use of a suitable adhesive. This assists in minimising slip and therefore maintaining excellent barrier performance. Numerous suitable adhesives would be readily apparent to those having skill in the present art. Preferably the adhesive is selected so as to chemically bond to the at least one starch layer. Preferred adhesives comprise one or more polyurethanes.

Advantageously, the use of an adhesive overcomes or minimises the need for modified or grafted other layers to be utilised as tie layers. Accordingly, for example, standard film polyethylene grades may be successfully employed as polyolefin other layers in the multi-layer film. This is desirable from a cost consideration.

Other suitable adhesives include EVA copolymers, acrylic copolymers and terpolymers, ionomers, metallocene derived polyethylene, ethylene acrylic ester terpolymers and ethylene vinyl acetate terpolymers.

Those skilled in the art will be familiar with other adhesive lamination technology that would be suitable for adhering various types of plastics, including heat activated and UV activated systems. Exemplary adhesives include, polyurethane, epoxy, nylon, acrylic and acrylate.

Method of Preparation of the Multilayer Film

The multilayer film can be made by a variety of processes. The multilayer film can be made by co-extrusion, coating, and other laminating processes. The film can also be made by casting or blown film processes.

Coextrusion tends to use tie layers, and utilises modified other layers, such as modified (grafted) polyolefins. Coextrusion is generally able to achieve thinner overall gauges. Lamination is more suitable for thicker multilayer films utilising an adhesive.

In one embodiment a three layer film is provided comprising an inner starch layer and two outer polyolefin layers.

In other embodiments adhesive layers may be employed between the starch layer and the polyolefin layers thus yielding a five layer film.

Applications

It should be understood by those with skill in the art that a three or five layer film is only one of many possible embodiments that employs starch and other layers. The number of layers and their relative thicknesses may be adjusted depending on the function or end-use of the film.

Additionally, further film layers comprising other materials commonly utilised in barrier film applications may be envisaged. Exemplary further film layers include metallised films, non-polymer films and the like.

The multilayer film has many uses including grocery bags, stretch-wraps, food packaging films, package containers, package lids where low water vapour and oxygen transmission rates are required.

Accordingly, in a further aspect there is provided a use of a multilayer film according to any of the aforementioned embodiments in packaging, preferably in packaging foodstuffs.

In a yet further aspect there is provided an article of manufacture comprising the multilayer film according to any one of the aforementioned embodiments. A preferred article of manufacture is a food package, such as containers, lids, bags, stretch-wraps and films.

Throughout this specification, use of the terms "comprises" or "comprising" or grammatical variations thereon shall be taken to specify the presence of stated features, integers, steps or components but does not preclude the presence or addition of one or more other features, integers, steps, components or groups thereof not specifically mentioned.

DETAILED DESCRIPTION OF THE INVENTION

It will now be convenient to describe the invention with reference to particular embodiments and examples. These embodiments and examples are illustrative only and should not be construed as limiting upon the scope of the invention. It will be understood that variations upon the described invention as would be apparent to the skilled addressee are within the scope of the invention. Similarly, the present invention is capable of finding application in areas that are not explicitly recited in this document and the fact that some applications are not specifically described should not be considered as a limitation on the overall applicability of the invention.

Polyolefins

Suitable LLDPE, HDPE and polypropylene can be produced by a Ziegler, single-site, or any other olefin polymerization catalyst. Ziegler catalysts and co-catalysts are well known in the art. Metallocene single-site catalysts are transition metal compounds that contain cyclopentadienyl (Cp) or Cp derivative ligands. For example, U.S. Pat. No. 4,542,199, teaches the preparation of metallocene catalysts. Non-metallocene single-site catalysts containing heteroatomic ligands, e.g., boraaryl, pyrrolyl, azaborolinyl or quinolinyl are also well known in the art.

The HDPE can also be multimodal. By "multimodal" it is meant that the polymer comprises at least two components, one of which has a relatively low molecular weight, the other a relatively high molecular weight. The multimodal polyethylene can be produced by polymerization using conditions that create a multimodal polymer product. This can be accomplished by using a catalyst system with two or more different catalytic sites or by using two or multi-stage polymerization processes with different process conditions in the different stages (e.g. different temperatures, pressures, polymerization media, hydrogen partial pressures, etc). Multimodal HDPE may be produced by a multistage ethylene polymerization, using a series of reactors, with comonomer addition in only one of the reactors.

Modified Starch

A preferred modified starch component is hydroxypropylated amylose starch. Other substituents may be hydroxyethyl or hydroxybutyl to form hydroxyether substitutions, or anhydrides such as maleic phthalic or octenyl succinic anhydride can be used to produce ester derivatives. The degree of substitution (the average number of hydroxyl groups in a unit that are substituted) is preferably 0.05 to 1.5. A preferred starch is a high amylose maize starch. Another preferred starch is a high amylose tapioca starch. A preferred modified starch component is a hydroxypropylated high amylose starch (for example ECOFILM® marketed by National Starch and Chemical Company, or Gelose® A939 marketed by Penford).

The other starch component, if utilised, is any commercially available starch. This may be derived from, for example, wheat, maize, tapioca, potato, rice, oat, arrowroot, and pea sources. These starches may also be chemically modified.

Water Soluble Polymer

The water soluble polymer component of the starch layer is preferably compatible with starch, water soluble, biodegradable and has a low melting point compatible with the processing temperatures for starch. Polyvinyl alcohol is a preferred polymer but polymers of ethylene-vinyl alcohol, ethylene vinyl acetate or blends with polyvinyl alcohol may be used. A preferred concentration range 4 to 12% by weight, more preferably 8%-12%.

Plasticiser

A range of plasticisers and humectants are useful additions to the starch layer, in order to aid processing and control and stabilize the mechanical properties of the barrier material, in particular in reducing dependency on moisture content and relative humidity. The desired plasticiser content depends primarily on the required processing behaviour during a (co)-extrusion process and subsequent blowing or stretching processes as well as on the required mechanical properties of the end product.

Cost and food contact are important issues in choosing the appropriate plasticizer. The preferred plasticizer is a mixture of polyols, in particular sorbitol, and one or more other polyols particularly glycerol, maltitol, mannitol and xylitol, although erythritol, ethylene glycol and diethylene glycol are also suitable. The plasticizer plays a triple role:

1. it provides suitable rheology for the extrusion compounding process and for the lamination process,
2. it positively affects the mechanical properties of the product and,
3. it may act as an anti-retrogradation or anti-crystallizing agent.

The preferred plasticizer content is up to 20% by weight of the starch layer depending on the particular application and co-extrusion or lamination process.

Sorbitol, glycerol and maltitol blends are particularly suitable for modifying the mechanical properties of the formulation, as is xylitol and blends of xylitol with sorbitol and glycerol. The larger the number of OH groups, the more effective the plasticiser is in reducing crystallisation. Sorbitol, maltitol and xylitol are particularly good humectants. Glycerol helps dissolve polyvinylalcohol during processing. Crystallisation is observed when sorbitol is used on its own. Some polyols (sorbitol and glycerol in particular) may exhibit migration to the surface, where either an opaque crystalline film may form in the case of sorbitol, or an oily film in the case of glycerol. Blending various polyols inhibits this effect to varying degrees. Stabilisation may be enhanced with the addition of glycerol monostearate and sodium stearoyl lactylate as emulsifiers. Furthermore, synergistic effects with salt result in stronger effects on mechanical properties.

Other Plasticizers

Polyethylene glycol compounds may be used as emulsifying agents, plasticizers or humectants. Polyethylene oxide and polyethylene glycol alternately or together may also provide an increased water resistance, to prevent swelling which may result in delamination in multi-layer structures (MLS).

An alternative plasticiser is epoxidized linseed oil or epoxidized soybean oil. Being hydrophobic these additives may improve moisture sensitivity of the material. These plasticisers, preferably stablilized with an emulsifying system, aid processing but do not result in a significant further reduction in Young's modulus. Other plasticizers more commonly used in the PVC industry may be suitable, including tributyl citrate, 2,2,4 trimethyl-1,3-pentanediol diisobutyrate, and acetyl tri-ethyl citrate.

One may use up to 20% of a humectant or water binding agent or gelling agent which may act as a (co)plasticiser such as carrageenan, xanthan gum, gum arabic, guar gum or gelatine. Other humectants may be used such as sugar or glucose. Biopolymers such as carrageenan, typically used in food products as thickeners and partially soluble in cold water, fully soluble in hot water, are suitable to tailor mechanical properties. By binding water these components may have a significant plasticizing function. Gelatine may be added to improve the mechanical properties and reduce moisture sensitivity. Xanthan Gum has a high water holding capacity and also acts as an emulsifier and in starch compositions has an anti-retrogradation effect. Gum Arabic may also be used as a texturiser and film former, and the hydrophilic carbohydrate and hydrophobic protein enable its hydrocolloid emulsification and stabilization properties. Guar gum has similar anticrystallisation effects in starch compositions. Another suitable humectant is glyceryl triacetate.

Fatty Acid and/or Fatty Acid Salt

Fatty acids and/or fatty acid salts may be used as lubricants. The starch layer preferably comprises between 0.1 to 1.5% by weight of a $C_{12-22}$ fatty acid and/or a $C_{12-22}$ fatty acid salt. The fatty acid and/or fatty acid salt component is more preferably present in concentrations of 0.6 to 1%. Stearic acid is a particularly preferred component. Sodium and potassium salts of stearic acid may also be used. Cost can be a factor in the choice of this component but lauric, myristic, palmitic, linoleic and behenic acids are all suitable.

Adhesive

Polyurethane based adhesives are particularly suitable for fixing the other layer to the starch layer. The polyurethane adhesive may be prepared in situ through reaction of one or more isocyanates with the starch layer. Through reaction of the surface hydroxyl functions of the starch with isocyanate, urethane functions are formed. Preferred isocyanates are diisocyanates. Those skilled in the art would be able to select suitable isocyanates from the wide range typically employed in the art of polyurethane synthesis.

Alternatively, the polyurethane adhesive may comprise one or more polyols. Such two component systems comprising diisocyanate and polyol are well known in the art.

The adhesives may or may not contain solvent. The solvent may be organic or water based.

Exemplary isocyanates include methylene diphenyl diisocyanate and toluene diisocyanate. Exemplary polyols include polyether polyols such as polyethylene glycol or polypropylene glycol and polyester polyols such as adipate based polyols.

EXAMPLES

OTR was measured using ASTM F 1927-98 and WVTR was measured using ASTM F 1249-01. All component weights are expressed on a dry basis.

Example 1

A starch film was prepared by extrusion processing of a mixture of 88.5% by weight modified starch (ECOFILM®, National Starch and Chemical Company), 9% by weight polyvinylalcohol (Elvanol® 71-30), 2% by weight Cloisite 20A (Southern Clay Products) and 0.5% stearic acid and casting into a 300 μm sheet. This was then adhesively laminated on each side to 100 μm HDPE film using MOR Free PU adhesive (Rohm and Haas). The lamination was performed on a standard laminating machine.

Samples were conditioned for 2 weeks at 50% and 75% RH (for OTR) and 38° C./90% RH (for WVTR) and measured after equilibration.

Tables 1 and 2 collect the results.

TABLE 1

| Sample | Nominal % of starch layer thickness | Oxygen Transmission Rate ($cm^3/m^2 \cdot 24$ h at 23° C., 1 atm pure oxygen) | | Specimen thickness (micron) |
|---|---|---|---|---|
| PE/Starch/PE | 60 | 50% RH | <0.05 | 507 |
| | | | <0.05 | 470 |
| | | 75% RH | <0.05 | 496 |
| | | | <0.05 | 468 |

TABLE 2

| Sample | Nominal % of starch layer thickness | Water Vapour Transmission Rate ($g/m^2 \cdot 24$ h at 38° C., 90% RH) | Specimen thickness (micron) |
|---|---|---|---|
| PE/Starch/PE | 60 | 3.3 | 507 |
| 100/300/100 | | 3.2 | 470 |

Examples 2 & 3

A starch film was prepared by extrusion processing of a mixture of 88.5% by weight modified starch (ECOFILM®, National Starch and Chemical Company), 9% by weight polyvinylalcohol (Elvanol® 71-30), 2% by weight Cloisite 20A (Southern Clay Products) and 0.5% stearic acid and casting into a 150 μm sheet. This was then adhesively laminated on each side to 50 μm (Example 2) or 35 μm (Example 3) HDPE using a polyurethane adhesive system from Specialty Adhesives and Coatings. The lamination was performed on a standard laminating machine.

Samples were conditioned for 2 weeks at 50% and 75% RH (for OTR) and 38° C./90% RH (for WVTR) and measured after equilibration.

Table 3 collects the results.

TABLE 3

| Sample | Nominal % of starch layer thickness | Oxygen Transmission Rate ($cm^3/m^2 \cdot 24$ h) | | | | Water Vapour Transmission Rate ($g/m^2 \cdot 24$ h at 38° C., 90% RH) | |
|---|---|---|---|---|---|---|---|
| | | 50% RH, 23° C. | Thickness (micron) | 75% RH, 23° C. | Thickness (micron) | WVTR | Thickness (micron) |
| Example 2 | 60 | 0.55 | 258 | 0.91 | 265 | 3.00 | 260 |
| PE/Starch/PE | | 0.46 | 262 | 0.98 | 254 | 3.22 | 255 |
| Example 3 | 68 | 0.51 | 222 | 1.03 | 228 | 5.16 | 225 |
| PE/Starch/PE | | 0.55 | 227 | 1.16 | 225 | 5.30 | 225 |

Example 4

A starch film was prepared by extrusion processing of a mixture of 90.5% by weight modified starch (ECOFILM®, National Starch and Chemical Company), 9% by weight polyvinylalcohol (Elvanol® 71-30) and 0.5% by weight stearic acid and casting into a 350 μm sheet. This was then adhesively laminated on each side to 50 μm HDPE using a polyurethane adhesive system from Specialty Adhesives and Coatings. The lamination was performed on a standard laminating machine.

Samples were conditioned for 2 weeks at 50% and 75% RH (for OTR) and 38° C./90% RH (for WVTR) and measured after equilibration.

Table 4 collects the results.

TABLE 4

| Sample | Nominal % of starch layer thickness | Oxygen Transmission Rate cm³/m² · 24 h | | | | Water Vapour Transmission Rate g/m² · 24 h at 38° C., 90% RH | |
|---|---|---|---|---|---|---|---|
| | | 50% RH, 23° C. | Thickness (micron) | 75% RH, 23° C. | Thickness (micron) | WVTR | Thickness (micron) |
| PE/Starch/PE | 78 | 0.05 | 465 | 0.15 | 465 | 3.25 | 472 |
| | | 0.05 | 468 | 0.16 | 455 | 3.10 | 468 |

Example 5

A starch film was prepared by extrusion processing of a mixture of 90.5% by weight modified starch (ECOFILM®, National Starch and Chemical Company), 9% by weight polyvinylalcohol (Elvanol® 71-30) and 0.5% by weight stearic acid and casting into a 350 µm sheet. This was then adhesively laminated to 50 µm HDPE on one side, and an 80 µm polypropylene film on the other side using a polyurethane adhesive system from Specialty Adhesives and Coatings. The lamination was performed on a standard laminating machine.

Samples were conditioned for 2 weeks at 50% and 75% RH (for OTR) and 38° C./90% RH (for WVTR) and measured after equilibration.

The results are collected in Table 5.

TABLE 5

| Sample | Nominal % of starch layer thickness | | Oxygen Transmission Rate cm³/m² · 24 h | | | | Water Vapour Transmission Rate g/m² · 24 h at 38° C., 90% RH | |
|---|---|---|---|---|---|---|---|---|
| | | | 50% RH, 23° C. | Thickness (micron) | 75% RH, 23° C. | Thickness (micron) | WVTR | Thickness (micron) |
| PE/Starch/PP | 73 | PP side facing permeant | <0.05 | 484 | 0.11 | 495 | 2.21 | 498 |
| | | | <0.05 | 500 | 0.11 | 500 | 2.16 | 490 |
| | | PE side facing permeant | Not measured | | 0.10 | 500 | Not measured | |
| | | | | | 0.16 | 484 | | |

Comparative Example 1

A starch film was prepared by extrusion processing of a mixture of 88.5% by weight modified starch (ECOFILM®, National Starch and Chemical Company), 9% by weight polyvinylalcohol (Elvanol® 71-30), 2% by weight Cloisite 20A (Southern Clay Products) and 0.5% stearic acid and casting into a 290 µm sheet.

Samples were conditioned for 2 weeks at 50% and 75% RH, and OTR measured after equilibration. The results are collected in Table 6.

TABLE 6

| Sample | | Oxygen Transmission Rate cm³/m² · 24 h at 23° C., 1 atm pure oxygen | Specimen thickness (micron) |
|---|---|---|---|
| Starch Sheet | 50% RH | 0.21 | 283 |
| | | 0.21 | 289 |
| | 75% RH | 1.48 | 282 |
| | | 1.30 | 285 |

Comparative Example 2

A starch film was prepared by extrusion processing of 100% by weight modified starch (ECOFILM®, National Starch and Chemical Company), and casting into a 300 µm sheet.

Samples were conditioned for 2 weeks at 50% and 75% RH (for OTR) and 38° C./90% RH (for WVTR) and measured after equilibration.

Table 7 shows the results.

TABLE 7

| Sample | Oxygen Transmission Rate $cm^3/m^2 \cdot 24\ h$ | | | | Water Vapour Transmission Rate $g/m^2 \cdot 24\ h$ at 38° C., 90% RH | |
|---|---|---|---|---|---|---|
| | 50% RH, 23° C. | Thickness (micron) | 75% RH, 23° C. | Thickness (micron) | WVTR | Thickness (micron) |
| Starch Sheet | 0.50 | 295 | 1.30 | 260 | 337 | 290 |
| | 0.49 | 320 | 1.26 | 295 | 374 | 275 |

Summary of Examples

Table 8 collects the OTR and OPV (oxygen permeation value) for each of the Examples. The OPV are normalised to 1 mm thick samples, based on the core starch layer thickness only.

TABLE 8

| Example | Core Thickness micron | Skin Thickness micron | OTR (50% RH) $[cm^3/m^2 \cdot 24\ h]$ | OPV (50% RH) $[cm^3 \cdot mm/m^2 \cdot 24\ h \cdot atm]$ | OTR (75% RH) $[cm^3/m^2 \cdot 24\ h]$ | OPV (75% RH) $[cm^3 \cdot mm/m^2 \cdot 24\ h \cdot atm]$ |
|---|---|---|---|---|---|---|
| 1 | 300 | 100 | <0.05 | <0.05 | <0.05 | <0.05 |
| 2 | 150 | 50 | 0.51 | 0.08 | 0.95 | 0.14 |
| 3 | 150 | 35 | 0.53 | 0.08 | 1.10 | 0.16 |
| 4 | 350 | 50 | 0.05 | 0.02 | 0.16 | 0.06 |
| 5 | 350 | 50 | <0.05 | <0.05 | 0.13 | 0.05 |
| CE1 | 290 | 0 | 0.21 | 0.06 | 1.40 | 0.41 |
| CE2 | 300 | 0 | 0.50 | 0.15 | 1.30 | 0.40 |

It is evident from the results that the multilayer films of Examples 1 to 5 show excellent barrier performance. It is noted that where the core starch layer is approximately 300 micron thick, OTR is substantially reduced in samples having outer layers, relative the performance of a starch layer alone. Thinner starch core layers have low OTR at high (75%) RH relative to starch alone. Starch layers alone, in the absence of outer layers, indicate very high WVTR.

The invention claimed is:

1. A multilayer film comprising:
  (a) at least one starch layer comprising a modified starch; and
  (b) at least one other layer having a water vapour permeability coefficient less than 1 g.mm/m².24hr.atm measured at 38° C. and 90% relative humidity; and
  wherein the total thickness of the at least one starch layer is in the range of from about 50 to about 150 microns and is greater than 20% of the total thickness of the multilayer film, wherein the modified starch has a degree of substitution less than 1.5;
  wherein the multilayer film has an oxygen permeability coefficient (OPC) that remains below 0.2 cm³ mm/m².24h.atm at 75% relative humidity for at least 10 days, wherein the OPC is normalised to 1 mm sample thickness and is based on starch layer thickness.

2. The multilayer film according to claim 1, wherein the multilayer film has an oxygen permeability coefficient (OPC) that remain below 0.1 cm³ mm/m².24h.atm at 75% relative humidity for at least 10 days.

3. The multilayer film according to claim 1, wherein the multilayer film has an oxygen permeability coefficient (OPC) less than 0.6 cm³ mm/m².24h.atm at 50% RH.

4. The multilayer film according to claim 1, wherein the water vapour permeability coefficient of the at least one other layer is less than 0.5 g.mm/m².24hr.atm.

5. The multilayer film according to claim 1, wherein the total thickness of the at least one starch layer is at least about 100 microns.

6. The multilayer film according to claim 1, wherein the at least one other layer comprises a polyolefin, polyethylene terephthalate, nylon, polyvinylchloride and polyvinylidene dichloride or mixtures thereof.

7. The multilayer film according to claim 6, wherein the polyolefin is selected from the group consisting of high density polyethylene, low density polyethylene, linear low density polyethylene, polypropylene, biaxially orientated polypropylene and mixtures thereof.

8. The multilayer film according to claim 1, wherein the multilayer film comprises an inner starch layer and two outer layers.

9. The multilayer film according to claim 1, wherein the at least one starch layer is fixed to the at least one other layer by an adhesive.

10. The multilayer film according to claim 1, wherein the modified starch comprises a high amylose starch.

11. The multilayer film according to claim 1, wherein the modified starch is chemically modified to include a hydroxyalkyl $C_{2-6}$ group or modified by reaction with an anhydride of a carboxylic acid.

12. The multilayer film according to claim 1, wherein the at least one starch layer further comprises at least one water soluble polymer.

13. The multilayer film according to claim 12, wherein the at least one water soluble polymer is selected from the group consisting of polyvinyl alcohol and polyvinyl acetate and mixtures thereof.

14. The multilayer film according to claim 1, wherein the at least one starch layer further comprises at least one plasticiser.

15. The multilayer film according to claim 14, wherein the at least one plasticiser comprises one or more polyols.

16. The multilayer film according to claim 1, wherein the at least one starch layer comprises one or more nanomaterials.

17. The multilayer film according to claim 16, wherein the nanomaterials comprise clay or modified clay or both.

18. A method of making the multilayer film according to claim 1, wherein the method comprises at least one of the steps of co-extrusion, coating, casting or film blowing.

19. Packaging comprising the multilayer film according to claim 1.

* * * * *